United States Patent [19]

Rinehart

[11] Patent Number: 5,044,108
[45] Date of Patent: Sep. 3, 1991

[54] TIP-UP FISHING RIG FOR ICE AND OPEN WATER

[75] Inventor: John R. Rinehart, Milton, Wis.

[73] Assignee: American Institute of Taxidermy, Inc., Janesville, Wis.

[21] Appl. No.: 620,082

[22] Filed: Nov. 3, 1990

[51] Int. Cl.$^5$ .......................................... A01K 97/12
[52] U.S. Cl. ...................................................... 43/17
[58] Field of Search ............................................ 43/17

[56] References Cited

U.S. PATENT DOCUMENTS

| | | | |
|---|---|---|---|
| D. 196,888 | 11/1963 | Pelsner | 43/17 |
| 1,173,827 | 2/1916 | Marsh | 43/17 |
| 1,253,746 | 1/1918 | Teeling | 43/17 |
| 3,745,689 | 7/1973 | Williams | 43/17 |
| 4,209,930 | 7/1980 | Boynton | 43/17 |
| 4,246,716 | 1/1981 | Elmer | 43/17 |
| 4,253,262 | 3/1981 | Johnson | 43/17 |
| 4,285,154 | 8/1981 | Grahl | 43/17 |
| 4,823,494 | 4/1989 | Waterman | 43/17 |
| 4,945,668 | 8/1990 | Keller | 43/17 |
| 4,953,317 | 9/1990 | Ruchel | 43/17 |

*Primary Examiner*—Kurt Rowan
*Attorney, Agent, or Firm*—Howard M. Herriot

[57] ABSTRACT

A combination summer-and-winter tip-up fishing rig is provided which may be used on the ice in winter weather and on open water in summer weather. The rig has an inverted dish-like body of light weight insulating and floating material, a flagpole, a spring means on said body at one edge thereof urging the flagpole to an upright position. The body has a top deck and a perimeter side wall extending down from the top deck, to form a hollow interior, divided by walls into a large cavity and a small cavity. A fishline reel spool is rotatably mounted in the large cavity with its vertical shaft extending through the top deck. The shaft has a horizontal arm above the deck which extends over the flagpole to hold the flagpole nearly horizontal in the fishing mode, and which turns to release the flagpole to the upright tipped-up mode when a fish strikes. A cotter pin may be swivel-mounted to the underside of the top deck centrally thereof extending down therefrom. An eye bolt may be mounted to the underside of the top deck intermediate the reel spool and the cotter pin. A fishline coiled about the reel spool may be, for smaller fish, fed through the eye bolt and then down into the water. For larger fish, the line is set into the cotter pin grip to extend therefrom down into the water.

11 Claims, 9 Drawing Sheets

TIP-UP FISHING RIG FOR ICE AND OPEN WATER

BACKGROUND OF THE INVENTION

Floating tip-up fishing rigs for fishing in open water are known. Also known are non-floating tip-up fishing rigs for spanning across and fishing through a hole in the ice.

SUMMARY OF THE INVENTION

This invention provides a tip-up fishing rig for use floating on open water and also for use on ice over a hole to fish through the hole in the water below, and which is light, compact and easy to use, both in summer conditions floating on open water and in winter conditions placed on the ice over a hole therein.

An inverted dish-shaped body is the main component of the rig. The body is made of cellular lightweight material which floats when placed on open water, and which also insulates to retain heat, when placed over a hole in the ice. A suitable material is polyurethane foam material. The body may be molded by pouring liquid foamable hardenable polyurethane into a mold cavity to foam, expand and harden. Various parts of the rig may be insert-molded into the body. A flagpole on the body is urged upright by a spring. The flagpole may be locked down in a horizontal inoperative position to be held there while the rig is stored, or while the fisherman baits the fishhook and lets out, from the fishline coiled about a rotatable reel spool, the desired amount of line. To operate the rig, the flagpole is then unlocked from inoperative position, and set in a nearly horizontal operational fishing position beneath a horizontal arm connected to the rotatable vertical shaft of the reel spool. When a fish takes the bait, pulling fishline out from the reel spool, the spool spins or turns, thus turning the horizontal arm, thereby releasing the flagpole to move to its upright tipped-up position under the urging of the spring. The body, supporting all the other parts of the rig, floats on the water so the rig may be used for summertime open water fishing. The body may also be used on the ice, covering a hole therethrough, for wintertime fishing, the body insulatingly holding heat in the hole to keep the water in the hole from freezing over.

DETAILED DESCRIPTION

Figure 1:
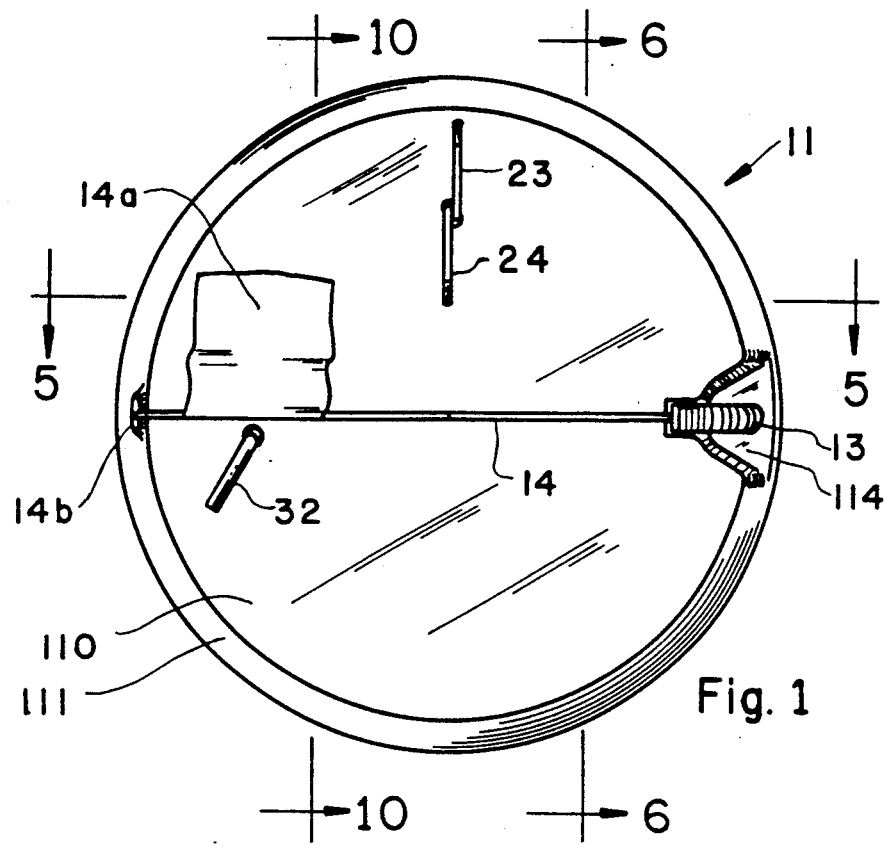
FIG. 1 is a top plan view of a fishing rig of this invention.
Figure 2:
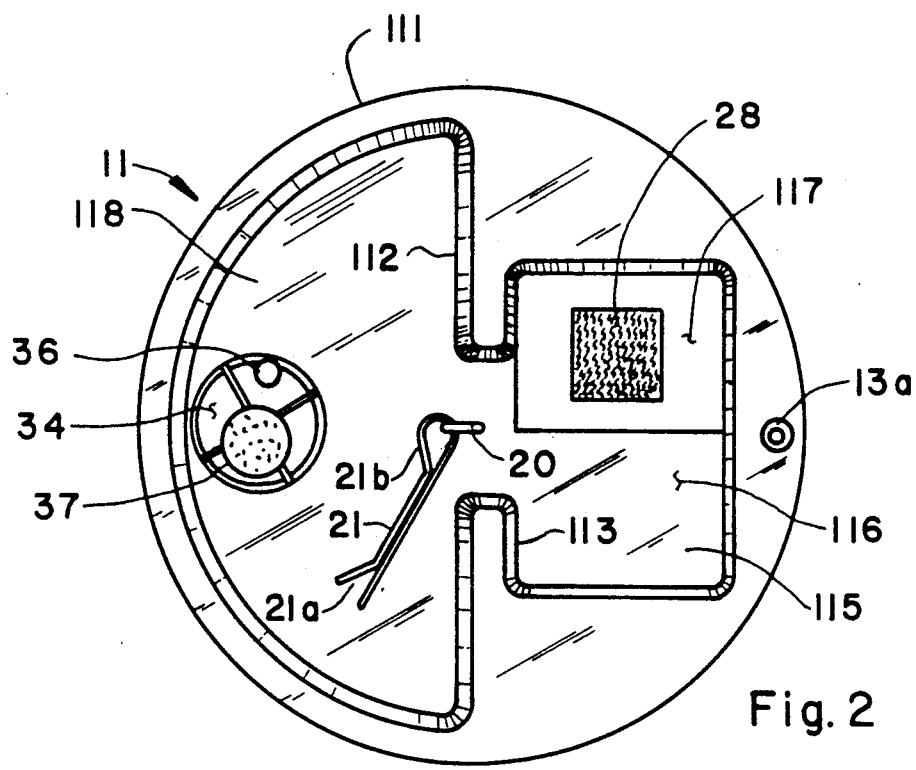
FIG. 2 is a bottom plan view thereof.
Figure 3:
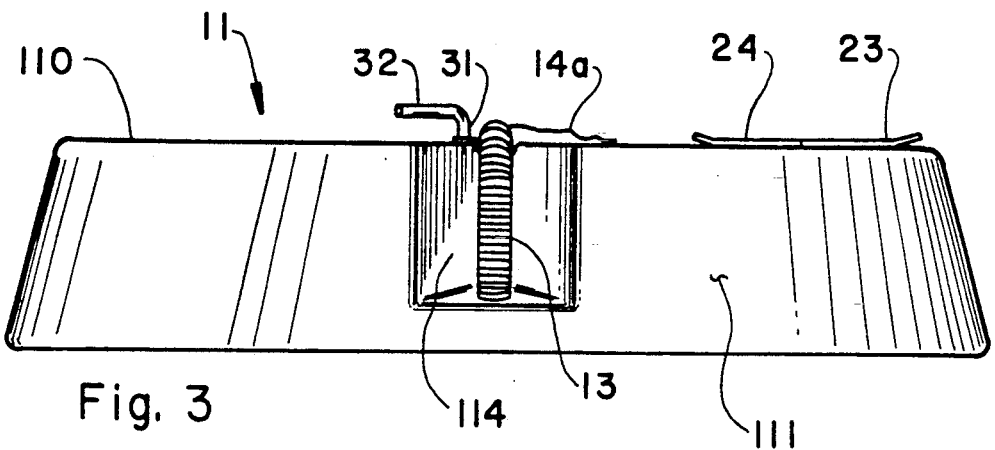
FIG. 3 is a rear elevation view thereof.
Figure 4:
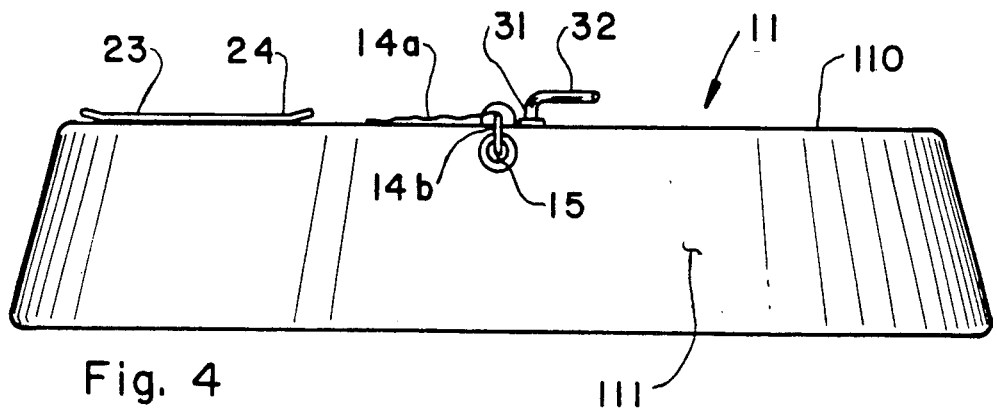
FIG. 4 is a front elevation view thereof.

Referring to FIGS. 1-14, there is shown a first embodiment of my winter-and-summer tip-up fishing rig invention having a body 11 of inverted dish-shape formed of light weight cellular insulating material. Body 11 has a top deck 110. About the perimeter of deck 110 is a sidewall 111 which extends downwardly, forming a main cavity under the deck 110. A pair of walls 112 and 113 extend inwardly from sidewall 11 dividing the main cavity into a large cavity 118 and a smaller cavity 115. The smaller cavity 115 has a stepped ceiling comprising a high ceiling 116 which is the underside of deck 110, over about half of cavity 115, and a lower ceiling 117 over the rest of cavity 115. A recess 114 is formed in the body at the rear side thereof, and in this recess is mounted a coil spring 13, the bottom end 13a of which lies at the bottom of sidewall 111. A flagpole 14 is connected to the top of coil spring 13 and is urged to an upright position by spring 13. The flagpole 14 has a flag 14a near its top end and has hook end 14b at its top end.

Sidewall 111 of body 11 has at its front face a hole 15 for receiving the hook end of the flagpole to lock it down in a horizontal inoperative position for storage or travel. Small cavity 115 has on its low ceiling 117 a pad or patch 28 of VELCRO fastening material, which mates with a patch 27 of mating VELCRO material for holding a handwarmer catalytic heater 26 in place in cavity 115 against ceiling 117.

Figure 10:
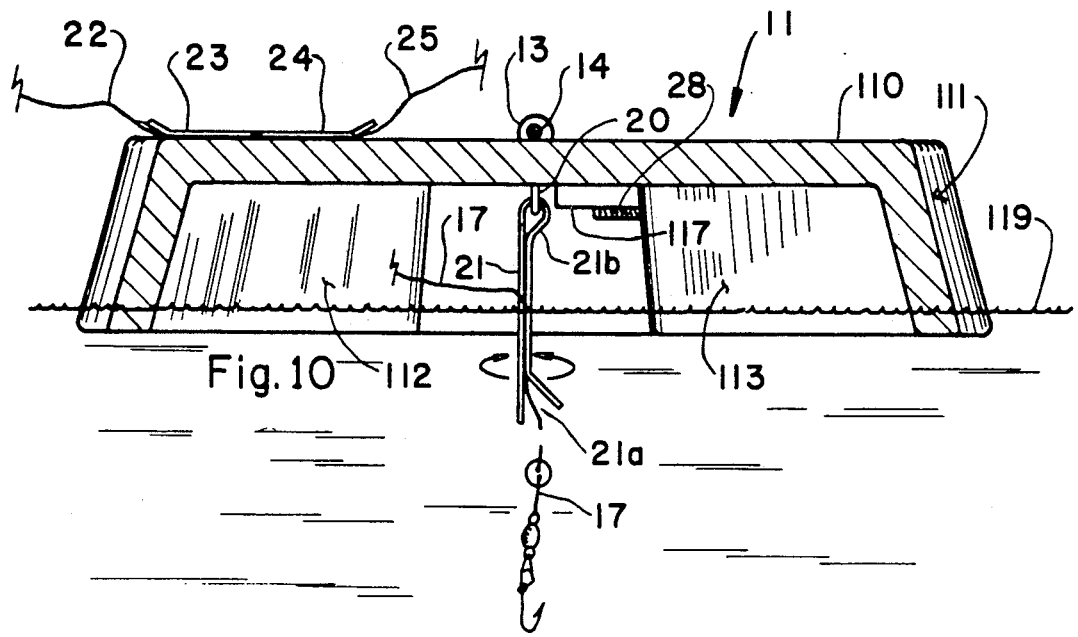
FIG. 10 is a sectional view of the fishing rig, taken on lines 10—10 of FIG. 1, showing the rig floating in open water.

On top of deck 110 is mounted a tether line clip 23 for holding a tether line 22, and an anchor buoy line clip 24 for holding an anchor buoy line 25, as shown in FIG. 10.

Figure 5:
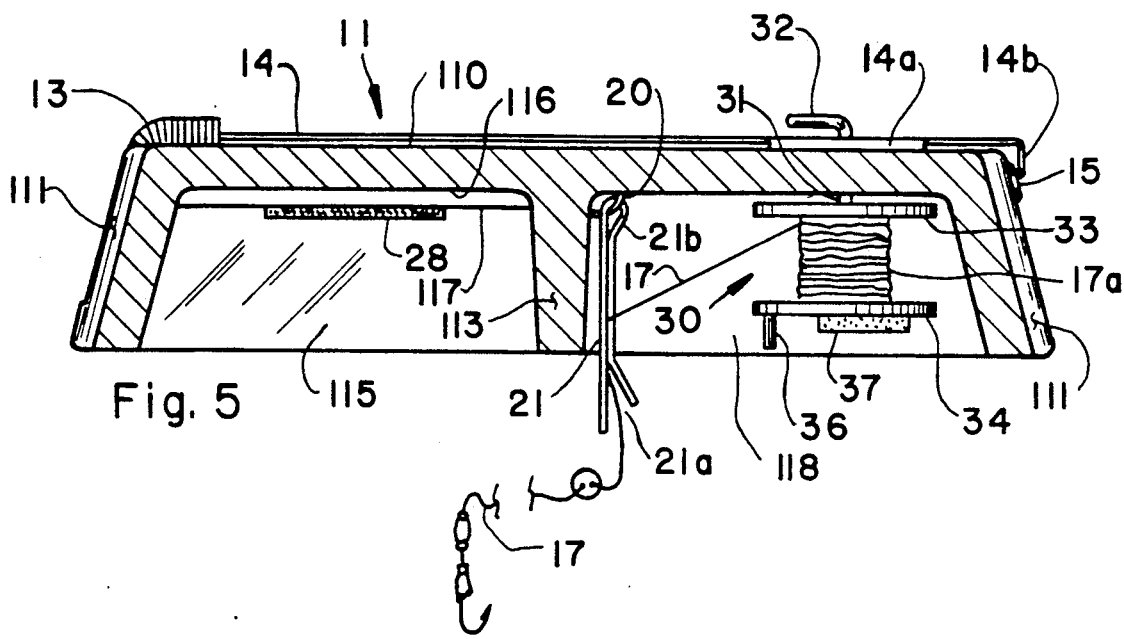
FIG. 5 is a sectional view thereof, taken on line 5—5 of FIG. 1.

A reel spool 30 is rotatably mounted in the body, beneath deck 110 in large cavity 118, as shown in FIG. 5. Reel spool 30 has a vertical axis shaft 31 extending upwardly through deck 110, and shaft 31 has a horizontal arm 32 above deck 110. Spool 30 has an upper flange 33 and a lower flange 34. On the bottom of lower flange 34 is a cork piece 37 for storage holding the tip of a fishhook, and also on lower flange 34 is a downwardly extending crank handle 36 for winding up line on the reel spool.

A fishline 17 is attached to reel spool 30 and has a portion 17a thereof coiled about reel spool 30, and line 17 also has, at its free end, fishing tackle including a sinker button and a fishhook.

An eye 20 at the center of the underside of deck 110 has a cotter pin fishline grip device swivel-connected thereto. A closed eye end 21b of the cotter pin 21 swivel-connects to eye 20. The other end of the pin 21 has a flared open end 21a.

Figure 11:
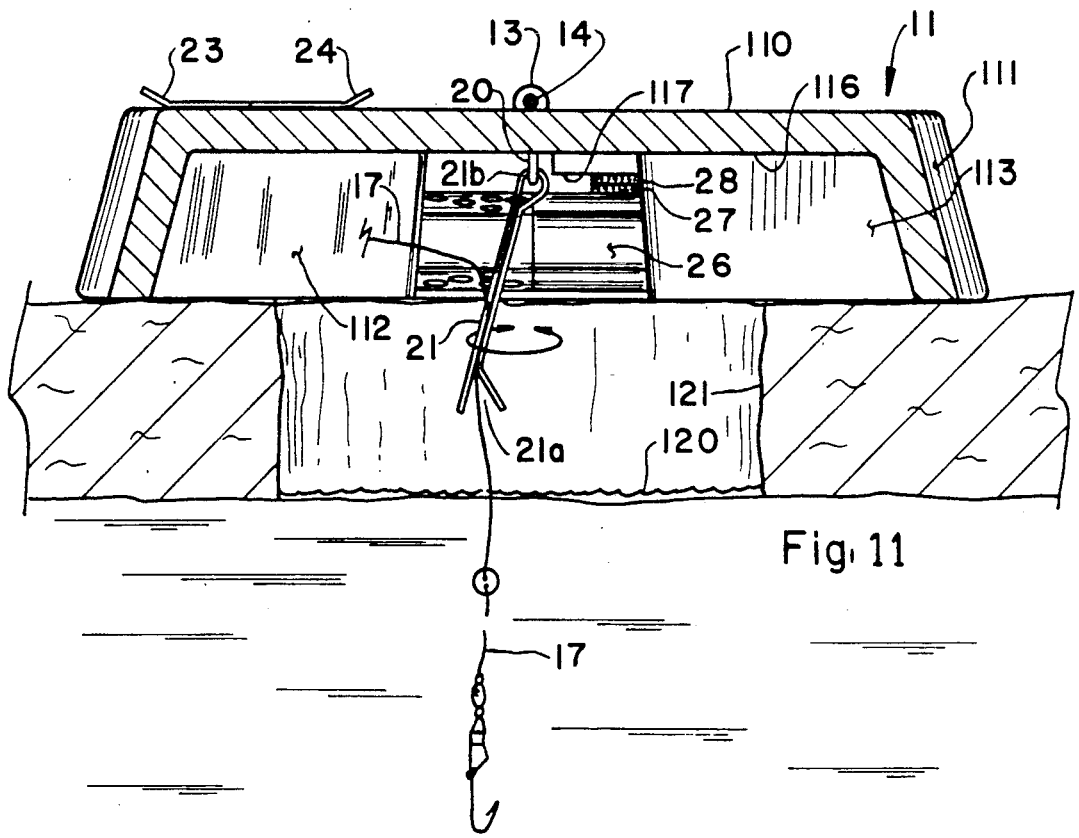
FIG. 11 is a sectional view of the rig also taken on lines 10—10 of FIG. 1, but showing the rig placed on ice over a hole therethrough for wintertime fishing, and showing said heater in place in the rig.

As shown in FIGS. 5, 10 and 11, the fishline 17 may be fed out from reel spool 30 and set into the center gripping portion of cotter pin 21, with the desired length of line 17 extending down therefrom into the water to the tackle end of the line, i.e. to the sinker button and fishhook.

For summertime or open water fishing, as shown in FIG. 10, the body 11 floats on the water 119 with the top deck 110 about two to four inches above the water, and with the sidewall 111 extending down into the water only about one-eighth to one-quarter of an inch, and the bottom open flared end 21a of cotter pin 21 may extend somewhat down into the water.

Figure 6:
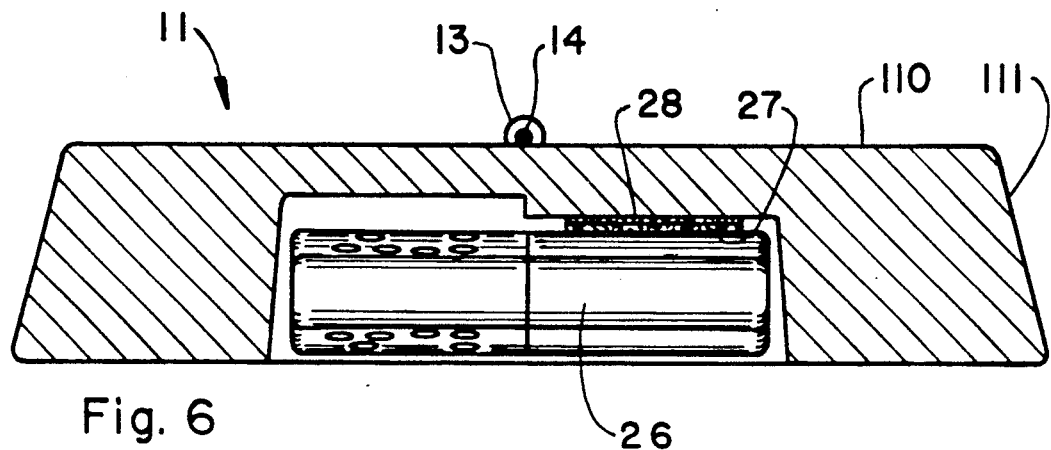
FIG. 6 is a sectional view thereof, taken on line 6—6 of FIG. 1, and also showing a handwarmer catalytic heater therein.

For wintertime ice fishing, as shown in FIG. 11, the body 11 sits on the ice 121, extending across and covering the hole in the ice, being substantially centered over the hole. Depending on the thickness of the ice, the lower open flared end 21a of the cotter pin 21 may not extend into the water 120 at the bottom of the ice hole, but may extend only down into the air in the ice hole above the water 120. The cellular material body 11, due to its insulating quality, prevents heat loss from the air within the ice hole and the cavities within the body, so that in most winter conditions, the water 120 will not ice-over for two to three hours. To extend that time several more hours, a small handwarmer or catalytic heater 26 may be placed in small body cavity 115, and held there by VELCRO fastener pads or patches 27, 28, as shown in FIG. 6. The heater is so installed with its imperforate half against the low ceiling 117, and with the heater's perforate half thus spaced down from and extending beneath the high ceiling 116, to thereby provide good air circulation about the perforate half of the heater, thus providing more effective warming of the air in body cavities 115 and 118 and in the ice hole. The use of the heater, combined with the insulating quality of the body 11 covering the ice hole, will usually keep the water 120 in the ice hole from skimming or icing over for four to six hours.

Figure 7:
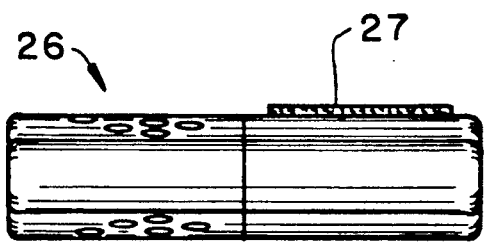
FIG. 7 is a side elevation view of the handwarmer catalytic heater.
Figure 9:
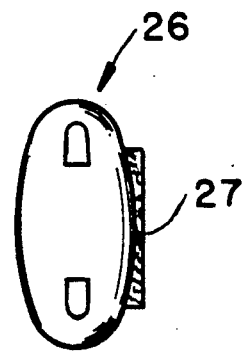
FIG. 9 is an end elevation view thereof.
Figure 8:
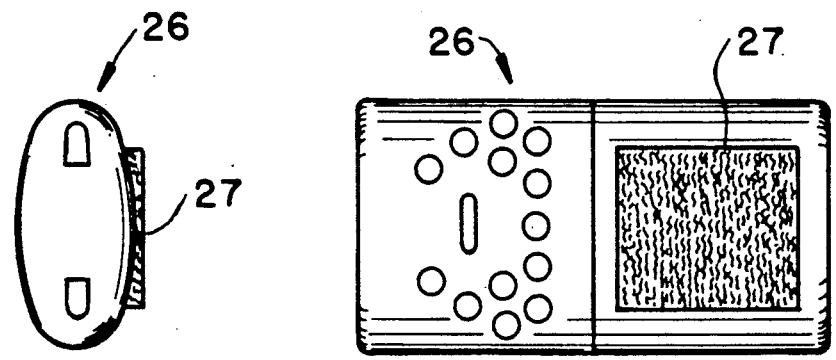
FIG. 8 is a top plan view thereof.

FIGS. 7, 8 and 9 show the heater 26 having a perforate half which covers a wick burner, and having an imperforate half, which contains the fuel for the heater. A VELCRO fastener pad 27 on the imperforate half permits installing the heater in cavity 116 to be held against VELCRO fastener pad 28 on the low ceiling 117, as shown in FIG. 6.

Figure 13:
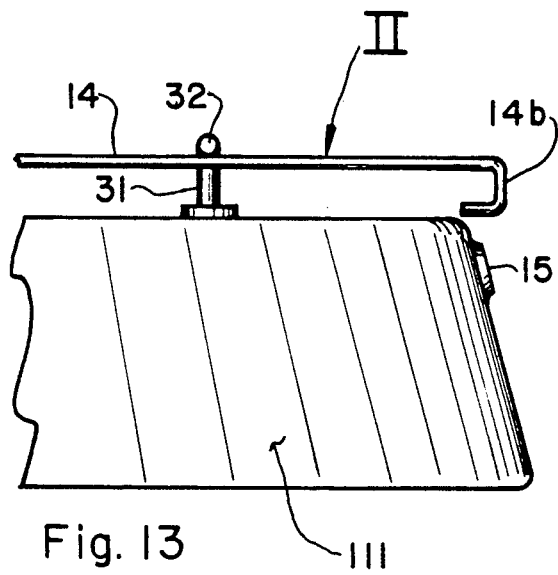
FIG. 13 is a view like that of FIG. 12, but showing the flagpole held in its fishing position.
Figure 14:
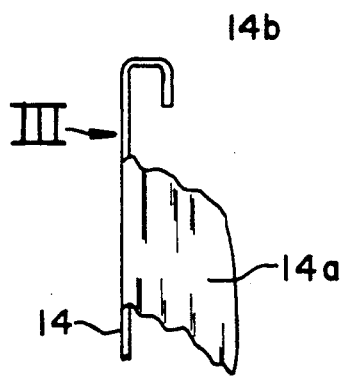
FIG. 14 is a left side elevational view of the rig, showing the flagpole in its tipped-up or upright position.
Figure 14:
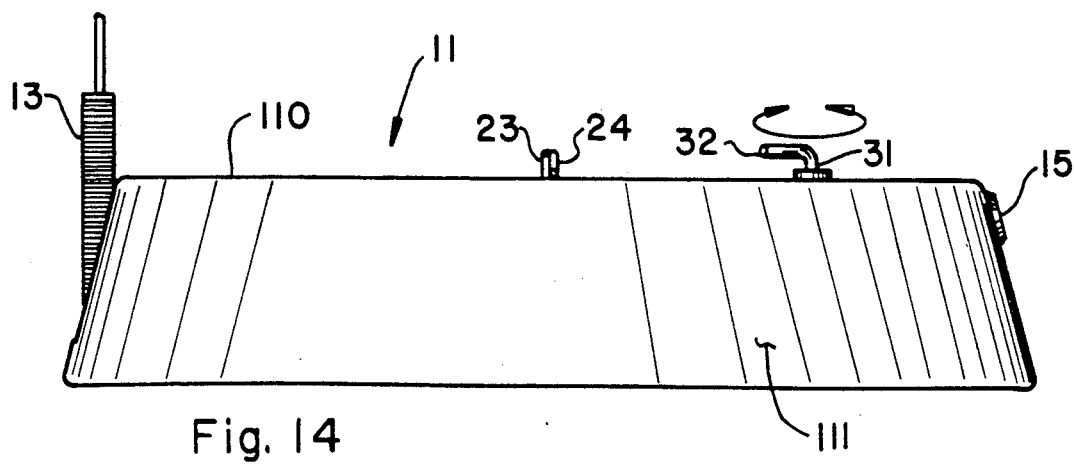
Figure 15:
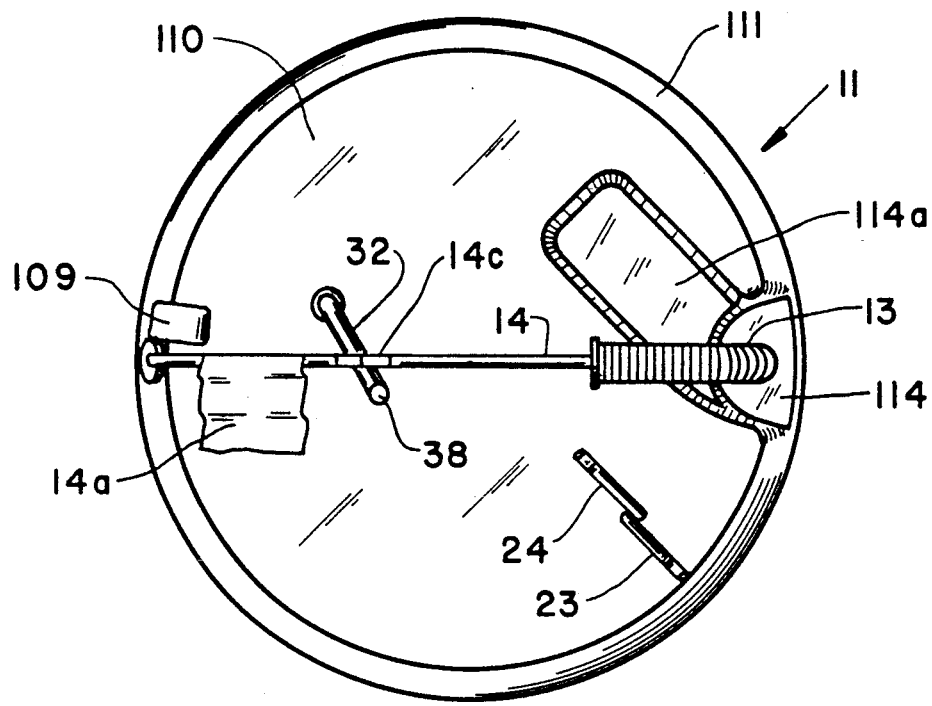
FIG. 15 is a top plan view of a fishing rig according to a second embodiment of the invention, with the flagpole showing in locked-down position.
Figure 16:
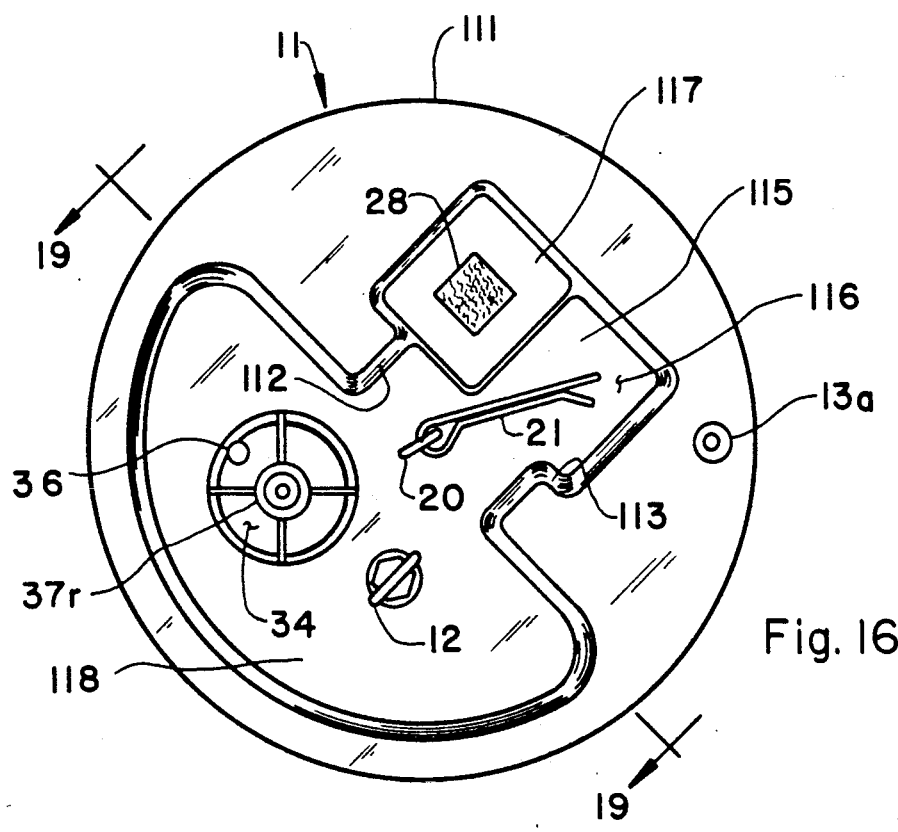
FIG. 16 is a bottom plan view thereof.
Figure 17:
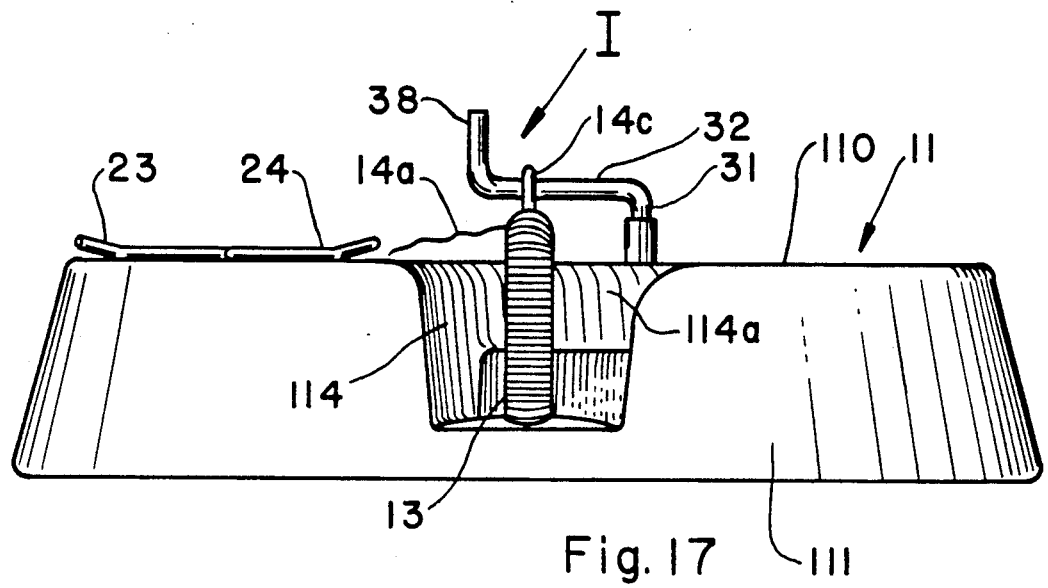
FIG. 17 is a rear elevation view thereof.
Figure 18:
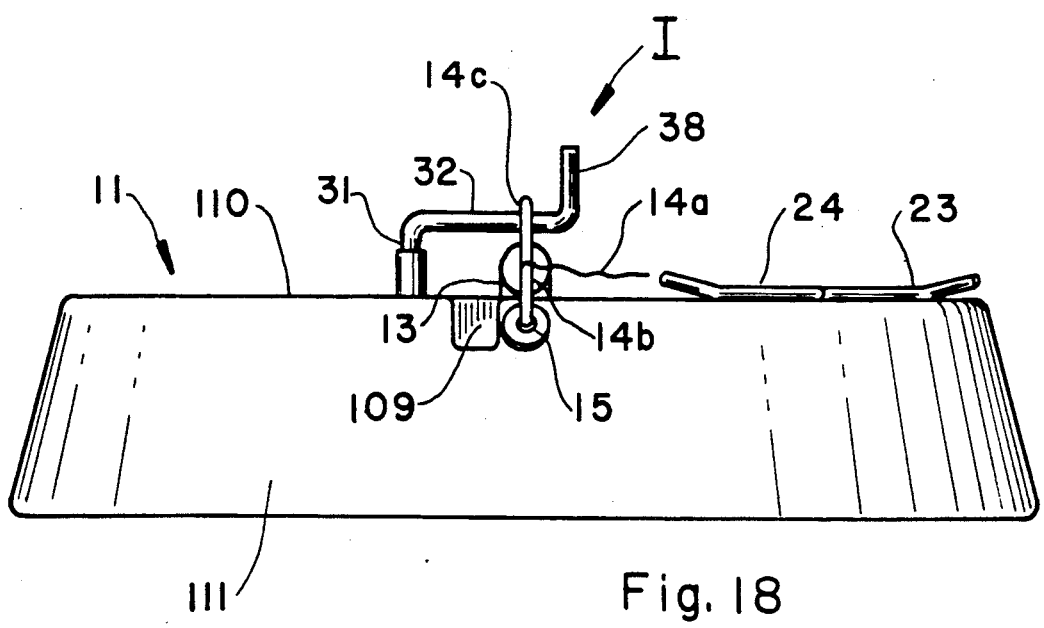
FIG. 18 is a front elevation view thereof.
Figure 19:
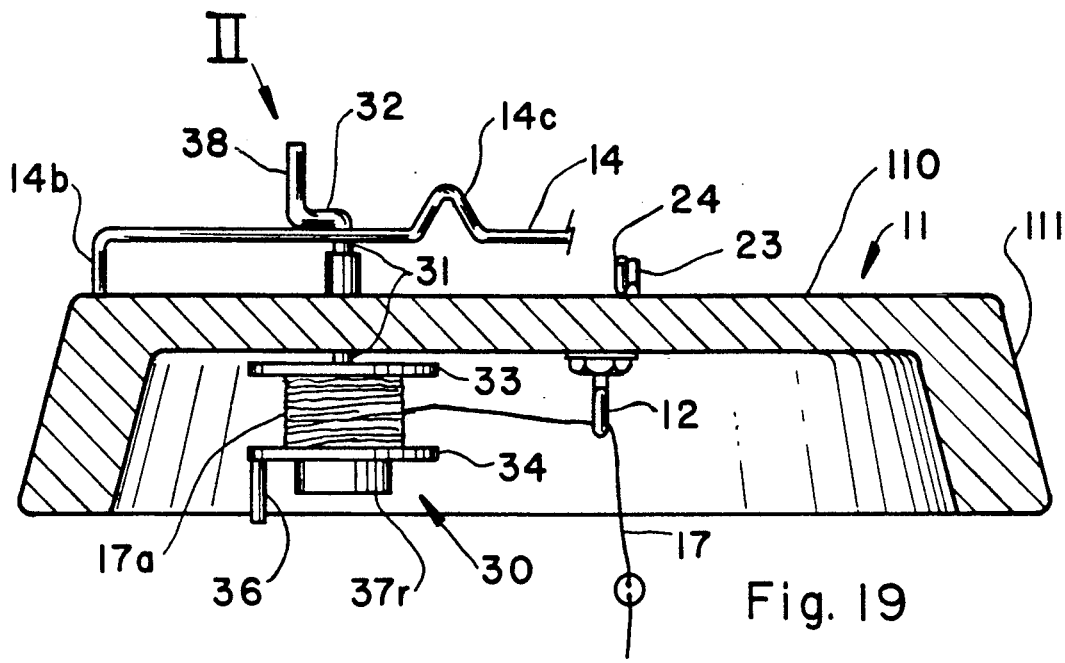
FIG. 19 is a sectional view thereof, taken on line 19—19 of FIG. 16, but with the flagpole in fishing position and shown partially.
Figure 20:
FIG. 20 is a partial front elevation view thereof, showing the flagpole in fishing position.
Figure 20:
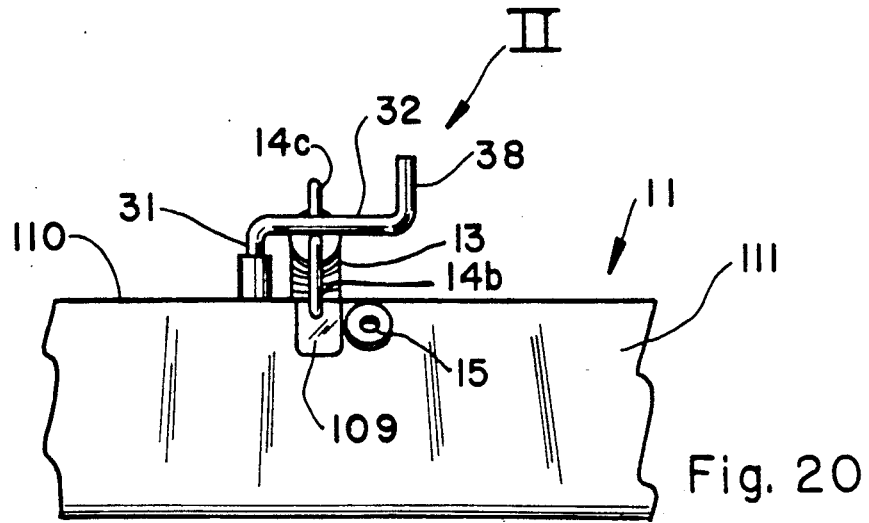
Figure 21:
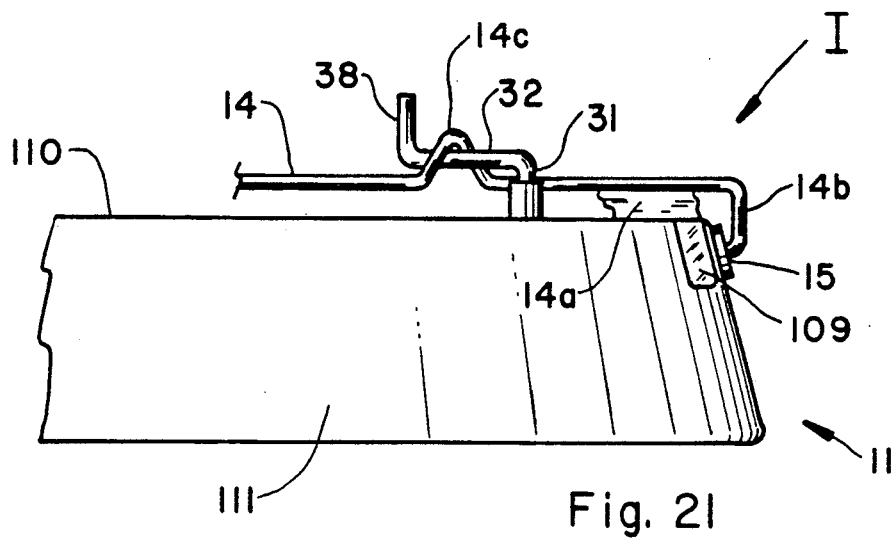
FIG. 21 is a partial left side elevation view thereof, with the flagpole in locked-down position.
Figure 22:
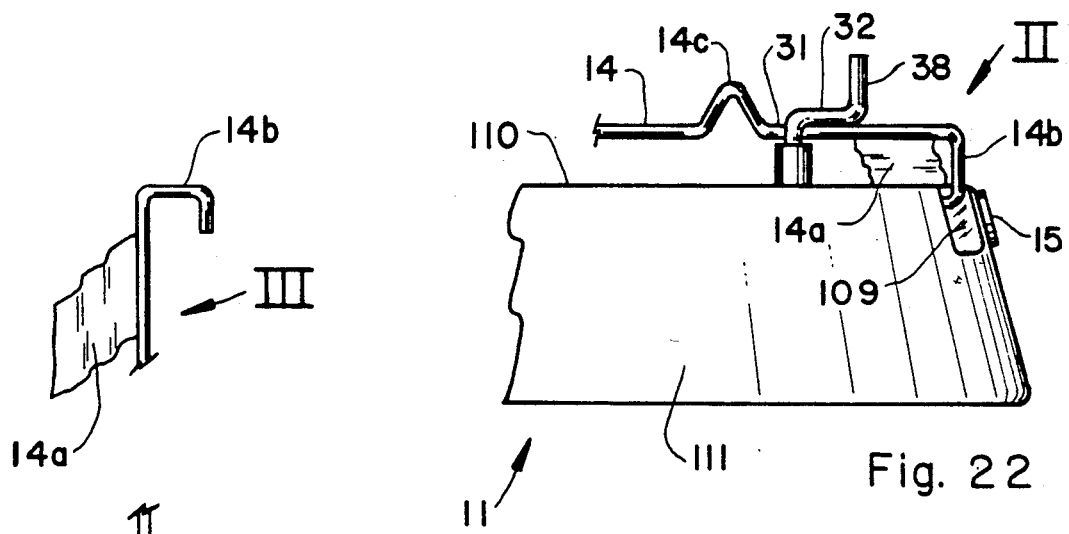
FIG. 22 is a like view thereof, but with the flagpole in fishing position.
Figure 23:
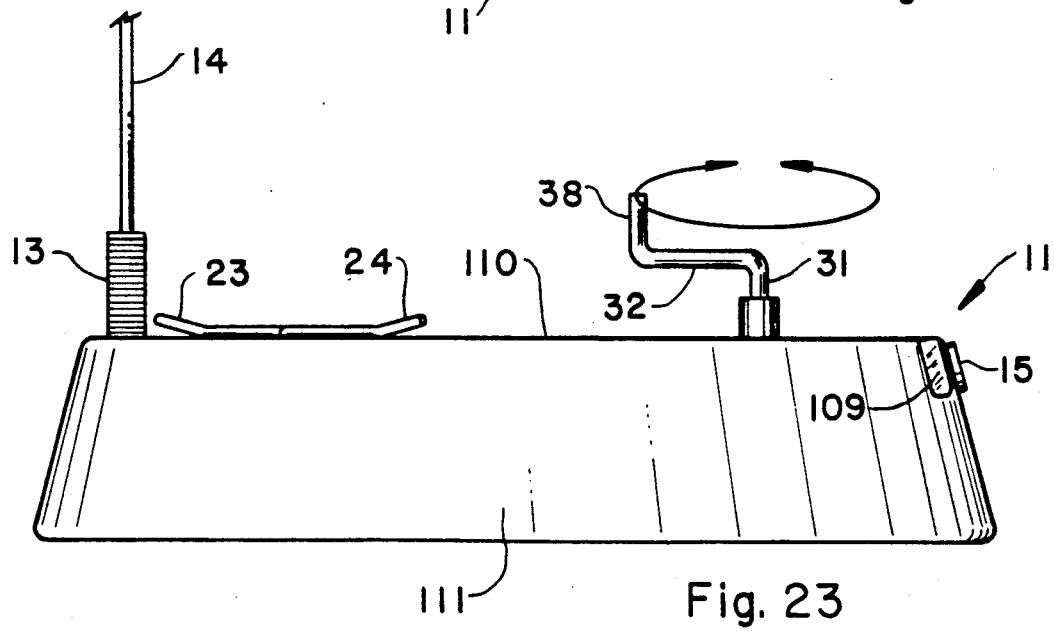
FIG. 23 is a left side elevation view thereof, with the flagpole in its tipped-up position.

The tip-up rig, whether floating on open water, as in summertime fishing, or resting on ice over a hole in the ice, as in wintertime fishing, operates in the same manner, as follows. The fishline 17 is pulled out from quantity 17a thereof on the spool reel 30, to obtain the desired depth length, and the fishhook is baited and dropped into the water. The fishline portion extending immediately from the spool reel 30 is then set into the grip portion of cotter pin 21. The flagpole is then removed from the locked-down horizontal position I shown in FIG. 12, and placed in a near horizontal position under horizontal arm 32, i.e. the fishing position II, as shown in FIG. 13. When a fish takes the bait, pulling the line out of cotter pin 21, and off the spool reel 30, causing rotation of spool reel 30, the arm 32 rotates therewith to release flagpole 14, which under the urging of spring 13 moves to the upright tipped-up position III, as shown in FIG. 14.

Figure 12:
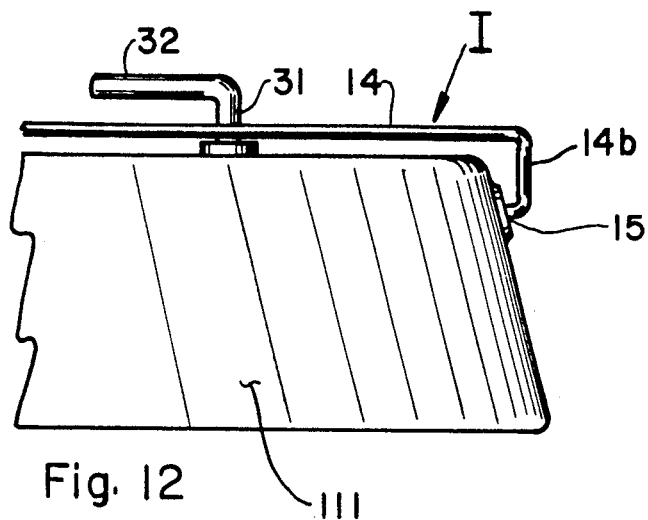
FIG. 12 is a partial left side elevational view of the rig, showing the flagpole locked down in its inoperative or stored position.

When not in use, the rig may best be stored for travel, or other non-use, by placing the hook end 14b of flagpole 14 in hole 15 to hold the flagpole locked down in inoperative position I, as shown in FIG. 12 and in FIGS. 1, 3, 4, 5 and 6. The flagpole is placed in this inoperative or stored position by pulling the flagpole away from spring 13, thereby slightly extending spring 13, and setting the end of hook 14b into hole 5, and allowing spring 13 to retract. The reverse procedure is used to remove the flagpole from this locked-down position, i.e. one pulls again on the flagpole, slightly extending spring 13 thereby removing hook 14b from hole 15.

Referring now to FIG. 15-23, there is shown a second embodiment of my invention, wherein like parts have the same reference numerals as those of the first embodiment. The operation of the two embodiments are very similar, and the flagpole is locked-down, set in fishing position, and tipped-up in the same manner.

In this second embodiment, however, a recess 109 in top deck 110 and sidewall 111 is provided at the front side of body 11. Recess 109 allows plenty of room for the hook end 14b of flagpole 14 when in the fishing position II, to thereby lessen chances of any interference hang-up occurring between hook end 14b and body 11. Recess 109 also provides wind-stop walls, so that flagpole 14 may move only slightly to left or right by strong blowing winds, because the side walls of recess 109 stop and prevent any further movement of flagpole 14 to the left or right.

As another feature of this second embodiment, a recess 114a is provided in top deck 111, immediately adjacent to recess 114. Recess 114a is for receiving a battery, which may be press-fit thereinto, so that if desired, a flashlight bulb may be placed on the flagpole and wired to the battery through a mercury tilt-switch, on the flagpole, to provide an electric light indication of a tipped-up flagpole when fishing in the dark at night.

Also, in this second embodiment, an eye bolt is installed with its eye 12 on the underside of top deck 111 intermediate reel spool 30 and the eye 20 for cotter pin 21. When fishing for smaller fish, the fishline may be fed from reel spool 30 through the eye 12 and thence directly down to the fishhook without using cotter pin 21. This provides a "light" or "easy" trip or set, more desirable for small fish strikes. When fishing for larger fish, the fishline may be fed into the grip of cotter pin 21 and thence down to the fishhook. This provides a "heavy" or "hard" trip or set more desirable for large fish strikes.

Another feature of the second embodiment is that reel spool 30 has not only a downwardly extending crank handle 36 at the bottom of lower flange 34, but also has at the end of horizontal arm 32, an upright crank handle 38, so that the spool may be hand cranked either from beneath deck 111 by handle 36, or from above deck 111, by handle 38, whichever is most convenient at the moment depending upon then existing circumstances, to wind up line on reel spool 30.

In this second embodiment, at the bottom of lower flange 34 of reel spool 30, there is a ring-shaped cork 37r, which may receive the tip of a fishhook for storage, the tip being placed into the inner edge of the ring of cork.

And finally, a feature of the second embodiment is that the flagpole 14 has an inverted V-shaped crook 14c therein which engages horizontal arm 32 and rests against vertical upright crank handle 38 when the flagpole is in the locked-down horizontal position I for storage or travel, preventing reel spool 30 from rotating, thereby preventing line from leaving the spool and becoming tangled with objects of the tip-up rig or objects stored with the rig.

What is claimed is:

1. A tip-up fishing rig comprising:
   an inverted dish-like body of light weight and heat-insulating material, having a top deck and a sidewall extending down about the perimeter of said deck defining a cavity under said deck and within said sidewall;
   a flagpole;
   a spring connecting said flagpole to said body and urging said flagpole to an upright position;
   a reel spool in said cavity under said deck rotatably mounted to said deck, having a vertical axle shaft extending up through said deck, said shaft having a horizontal arm above said deck;
   a fishline coiled about said reel spool which when pulled out therefrom rotates said axle shaft;
   whereby said flagpole may be placed and held in a near horizontal fishing position under said arm; and
   whereby when fishline is pulled out from said reel spool thereby rotating said axle shaft, said arm turns and releases said flagpole to said upright position;
   said body when placed on ice over a hole therethrough, slows heat loss from the air in said cavity and in said hole to delay the icing over of the water in said hole; and
   said body when placed on water, floats thereon with the bottom of said sidewall being only slightly submerged and being the only submerged part of the body.

2. The invention of claim 1 wherein:
   a cotter pin is mounted to the underside of said top deck whereby said fishline may be gripped in said pin for a heavy fish setting.

3. The invention of claim 1 wherein:
   an eye bolt is mounted to the underside of said top deck whereby said fishline may be threaded through the eye of said bolt for a light fish setting.

4. The invention of claim 2 wherein:
   an eye bolt is mounted to the underside of said top deck intermediate said spool and said cotter pin, whereby said fishline may be threaded through the eye of said bolt instead of being gripped in said pin, to thereby obtain a light fish setting.

5. The invention of claim 1 wherein:
   said horizontal arm has at its outer end an upwardly extending vertical handle.

6. The invention of claim 5 wherein:
   said reel spool has at its bottom outer edge a downwardly extending vertical handle.

7. The invention of claim 1 wherein:
   said flagpole has an inverted V-shaped crook therein engageable with said horizontal arm when said flagpole is locked down in horizontal position to thereby prevent rotation of said reel spool.

8. The invention of claim 1 wherein:
   said flagpole is, at its free end, bent into a hook; and
   said side wall has, near said top deck, a holding hole for receiving the end of said hook to lock down said flagpole in inoperative stored position.

9. The invention of claim 8, wherein:
   said body has in said top deck and said side wall, near said holding hole, a wind stop cavity substantially larger than said holding hole for receiving the hook end of said flagpole when in said fishing position to thereby minimize interference hang-up between said hook and said body; and
   the side walls of said wind stop cavity limiting sidewise movement of said flagpole when in its fishing position.

10. The invention of claim 1 wherein:
    said reel spool has on its bottom a ring-shaped cork for receiving the tip end of a fishhook connected to the free end of said fishline, when not using said rig.

11. The invention of claim 1 wherein:
    said body at one side has a spring recess where said top deck joins said side wall, said spring being mounted therein; and
    said body has a battery-receiving cavity in said top deck adjacent and connected to said spring recess, for receiving a battery press-fit thereinto.

* * * * *